Oct. 16, 1928.
F. MATZELLE
DOUGH CUTTER
Filed Oct. 27, 1926
1,688,283
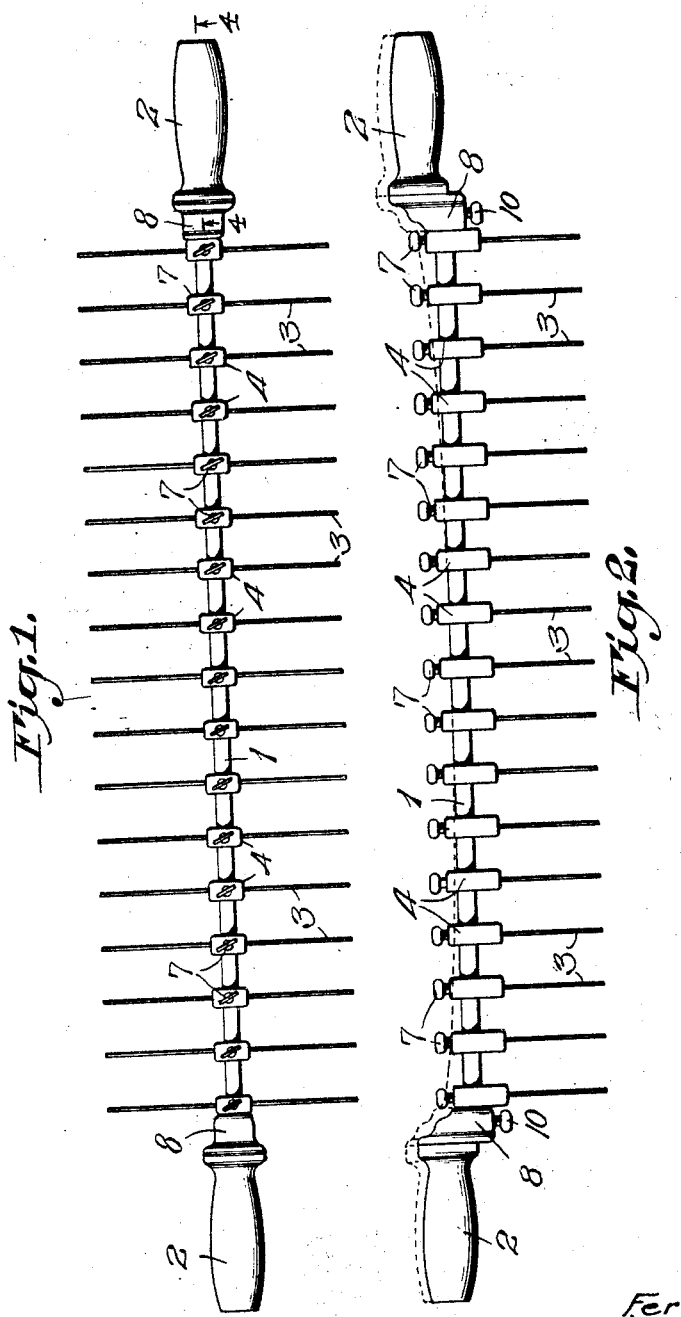
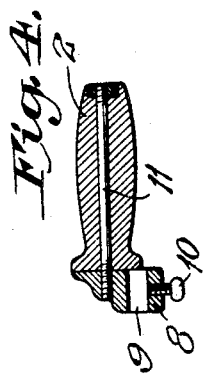
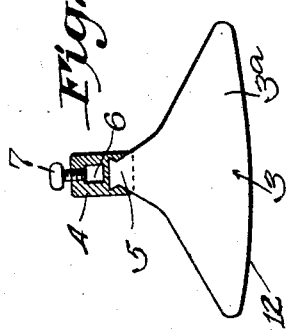
INVENTOR
Ferdinand Matzelle
BY George B. Willcox
ATTORNEY Patented Oct. 16, 1928.

1,688,283

UNITED STATES PATENT OFFICE.

FERDINAND MATZELLE, OF SAGINAW, MICHIGAN.

DOUGH CUTTER.

Application filed October 27, 1926. Serial No. 144,606.

This invention relates to hand-operated dough cutters and is intended to be used by bakers for rapidly cutting rolls of dough into individual articles to be baked.

An example of the use of the device is in the making of nut rolls, where the baker first prepares a thin sheet of dough and after sprinkling it with chopped nut meats rolls it into cylindrical form, usually about two inches diameter and several yards long.

The practice heretofore has been to cut these pieces into short lengths, each of which forms a nut roll when baked. The cutting is usually done by hand, using a large knife. This requires that the baker shall make one cut for each article and the work is slow and relatively expensive.

The object of my invention is to provide a cutting device that will cut such a dough cylinder into the desired number of equal pieces, cutting a large number of pieces at each operation.

Another object is to make the blades adjustable as regards their spacing and to vary the number of pieces cut at a single operation.

A further object is to improve the cutting effectiveness by properly shaping the edges of the blades and also the bodies of the blades.

With the foregoing and certain other objects in view which will appear later in the specification, my invention comprises the devices described and claimed and the equivalents thereof.

In the drawings, Fig. 1 is a top plan view of the device.

Fig. 2 is a side view.

Fig. 3 is a side view of a blade partly in section.

Fig. 4 is a longitudinal section of a handle on line 4—4 of Fig. 1.

As clearly shown in the drawings, the device consists in a bar 1, preferably of square or other angular cross section, having on its ends a pair of handles 2, 2 that project longitudinally. A plurality of cutting blades 3 are mounted on the bar 1 in spaced relation. Each blade has a fastening device for securing it to the bar in its variously adjusted positions. This fastening device consists preferably of a block or casting 4, into which the shank 5 of blade 3 is fastened, either by being molded therein, as shown in Fig. 3, or by other suitable means. The block 4 has an opening 6 therethrough at right angles to the blade, and this opening is of shape to slidingly receive bar 1. The block may be clamped to the bar by means of a set screw 7.

Each handle 2 consists of a bracket 8 having a hole 9 to slidingly receive bar 1, a clamping screw 10 and a rod 11, upon which the handle 2 is mounted so as to rotate in the usual manner when the blades are rocked in the operation of cutting.

The cutting edge of blade 3 is curved or bowed, as shown at 12, in Fig. 3.

A greater or less number of blocks 4 as desired may be mounted on the bar 1, the distance between blades being equal to the height of the cut article. Any block may be removed from the bar by removing the handle and its bracket 8 and by loosening screw 10 and sliding the block off the bar. The axis of handle 2 is preferably higher than the axis of bar 1 to facilitate rocking the implement while cutting without touching the dough with the hands.

The blade, as shown in Fig. 3, is wide at its bottom to provide a long cutting edge 12, and narrow at its top or shank 5. Projecting wings 3$^a$ are thus formed which are useful when a slightly drawing cut is desired, without risk of the dough sticking to the sides of the blade during the later part of the cut.

Preferably bar 1 is made with a slight bow, as indicated by dotted lines in Fig. 2, and somewhat flexible in order that the operator, by pressing the handles downwardly may spring the bar to insure complete cutting action of the blades that are near the middle of the bar, or to adapt the blades to a slightly uneven surface on the cutting table.

Having thus described my invention, what I claim and desire to secure by Letters Patent is:

A dough cutter comprising a flexible bar, a handle-bracket slidably mounted on each end of said bar and releasably secured thereto, a handle secured to each bracket parallel with the bar and in offset relation thereto, blades formed with elongated substantially horizontal cutting edges and having an apertured block integral with each blade to slidingly receive the bar, and a set screw for clamping the block in variously adjusted positions along the bar.

In testimony whereof, I affix my signature.

FERDINAND MATZELLE.